R. C. SHEPHERD.
SAFETY DEVICE FOR AUTOMOBILES.
APPLICATION FILED OCT. 31, 1914.
1,167,726. Patented Jan. 11, 1916.
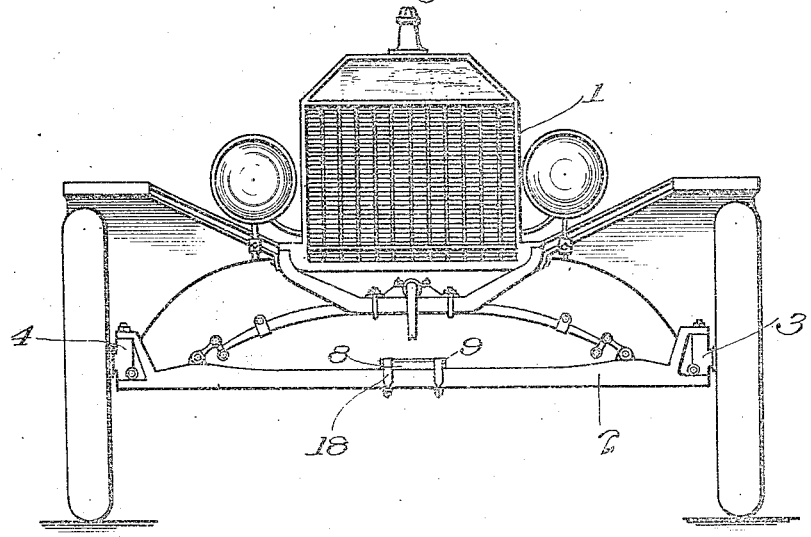
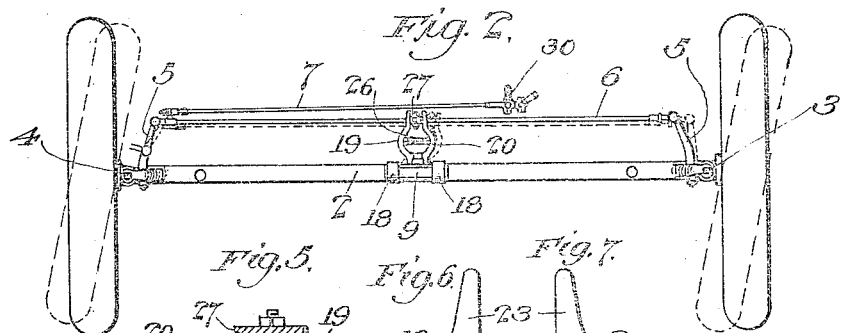
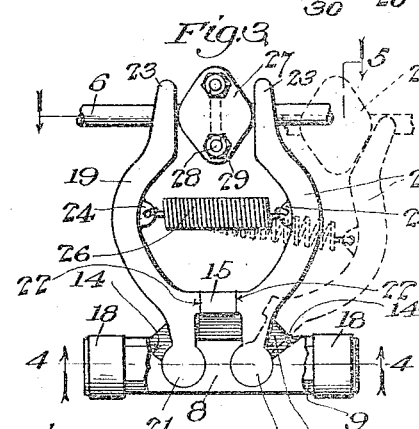
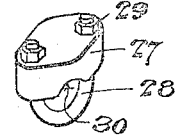
Inventor:
Robert C. Shepherd,

UNITED STATES PATENT OFFICE.

ROBERT C. SHEPHERD, OF LOS ANGELES, CALIFORNIA.

SAFETY DEVICE FOR AUTOMOBILES.

1,167,726.   Specification of Letters Patent.   Patented Jan. 11, 1916.

Application filed October 31, 1914. Serial No. 869,574.

*To all whom it may concern:*

Be it known that I, ROBERT C. SHEPHERD, a citizen of the United States, residing at Los Angeles, in the county of Los Angeles and State of California, have invented a new and useful Safety Device for Automobiles, of which the following is a specification.

The primary object of this invention is to provide a safety device for automobiles, which will prevent the machine from veering to one side or the other when the operator's hands are not on the steering wheel.

When driving a car, it is quite often necessary to momentarily release the steering wheel, and my device operates to check the longitudinal movement of the spindle connecting rod, and thus prevent the spindles of the steering wheels turning and changing the course of the machine.

The invention also aims to provide a safety device for automobiles, which may be made from castings having a minimum amount of machine work.

With these and other objects in view, the invention consists in certain novel features of construction, combination and arrangement of parts as will be hereinafter described, illustrated and claimed.

Referring to the drawings: Figure 1 is a front elevation of an automobile showing my safety device applied thereto. Fig. 2 is a top plan view of the front axle of an automobile and steering mechanism, showing parts of the steering gear and also showing my safety device in position thereon. Fig. 3 is an enlarged top plan view partly broken away, of the safety device. Fig. 4 is a vertical sectional view partly in elevation taken on the plane of line 4—4 of Fig. 3. Fig. 5 is a section partly in elevation on the plane of line 5—5 of Fig. 3. Fig. 6 is a plan view of one of the shifting fingers. Fig. 7 is a view similar to Fig. 6 showing the other shifting finger. Fig. 8 is a top plan view of one of the body castings. Fig. 9 is a bottom plan view of the other body casting. Fig. 10 is a perspective view of the block and attaching yoke.

Referring in detail to the drawings, by numerals, 1 designates as an entirety an automobile having a front axle 2, spindle bodies 3 and 4 provided with rearwardly projecting steering arms 5 connected by a spindle rod 6, which is shifted by a steering gear connecting rod 7.

In the preferred embodiment of my invention, I provide a body formed of two castings 8 and 9 respectively. The casting 8 is essentially rectangular having a transversely curved longitudinal recess 10 in its lower side to allow the casting to rest well upon the top of a flat or curved surface. The top of the casting is formed with a pair of sockets 11, each opening onto a recessed portion 12 of the somewhat triangular extension 13 of the castings. The recessed portion 12 forms a pair of shoulders 14 which are inclined outwardly from the sockets 11, and said recessed portion also forms a lug or stop 15 at the apex of the substantially triangular extension 13. The top casting 9 forms a cover for the sockets 11 and is rectangular in shape and its end portions project downwardly below the plane of the main central portion thereof to fit in end recesses 16 and hold the top casting against longitudinal movement. These castings have no machine details, and hence they may be made at a minimum expense. The body is secured to the front axle 2 preferably intermediate its ends on the top thereof by a pair of straps 18, said straps passing over the end portions of the top casting 9 in contact therewith.

A pair of similar fingers 19 and 20 having circular heads or enlargements 21 on one end is provided for coöperation with the body, and the enlargements fit and turn within the sockets 11, as clearly shown in Fig. 3. The fingers are formed with lugs 22 which contact with the lug 15, and when such a contact is maintained, the end portions 23 of the fingers are held in parallel spaced relation. The central portions of the fingers are bowed outwardly in opposite directions and cast with ears 24 having apertures 25 extending therethrough to receive the ends of the contractile spring 26, said spring serving to draw the lugs 22 in contact with the lug 15, and center the rod 6 through the medium of a block 27 rigidly secured to the rod. The block is preferably somewhat ovicular shaped, as shown, and is secured to the top of the rod 6 by a yoke 28 and nuts 29. The under side of the block is formed with a transverse recess 30, which receives the rod 6. The spring is not strong enough to be noticeable when steering the car, but is sufficiently strong to hold the machine on a straight course when the steering wheel is left free to turn. It will be readily seen that should the front wheels strike some obstruction, which would throw them to one side, one or the other, one of the fingers, depending upon which way the machine had turned, would act to force the rod 6 back to its central position, shown in Fig. 2, and this operation is illustrated very clearly in Fig. 3.

In some automobiles it often happens that the arm 30 which is connected to the end of the rod 7 and which actuates the latter is turned so that it moves beyond the central line of the rod and when this happens it requires quite a wrench to throw the arm back to its normal position. I prevent this excessive movement by having the shoulders 14 at such an angle that they are engaged by the fingers 20 just before the arm 30 reaches a dead center with reference to rod 7, and since the movement of the rod 7 is dependent upon the position of the fingers 20 it will be seen that said fingers control the distance which the rod 7 may be moved and hence control indirectly the movement of the arm 30.

I desire to call especial attention to the extreme strength and simplicity of my safety device. As before stated, the principal parts may all be cast and may be readily assembled. While I have shown and described the preferred embodiment of my invention, I do not wish to be limited to this exact construction, but may make such changes as will fall within the scope and spirit of the appended claims.

What I claim is:

1. The combination with the spindle connecting rod forming a part of the steering mechanism of a motor vehicle, of a safety device comprising a body formed with sockets, a pair of fingers having heads on one end, said heads fitting within the sockets, the body being formed with a stop lug between the fingers, spring means holding the fingers normally in contact with said stop lug at which time the free ends of the fingers are disposed in spaced relation to one another, and a block rigidly secured to the spindle connecting rod between said fingers and in the path thereof.

2. The combination with the spindle connecting rod of a vehicle of a safety device comprising a base, a lower member and an upper member, the lower member being formed with a pair of sockets and provided with an extension extending from said sockets, the upper member closing said sockets, a pair of fingers having terminal heads fitting within the sockets, the fingers projecting over said extension and being supported thereby, the lower member being formed with shoulders to limit the outward movement of the fingers, spring means for drawing the fingers toward each other, a lug formed on said extension, between the fingers to limit their movement toward each other, and a block secured to the spindle connecting rod and disposed between the fingers in the path thereof.

3. In an automobile safety device, a body to be attached to the stationary part of an automobile and consisting of an upper and a lower section, said lower section having sockets formed therein, an extension on said lower section, said extension and the section being recessed, a lug located on the extension between the sockets, said sockets opening in the recess, said upper section being placed upon the lower section and covering the sockets, and means for yieldingly holding the steering mechanism of the automobile in center position including fingers pivotally mounted within the sockets and being normally engaged with opposite sides of said lug, said lower section having shoulders on the outer side of each socket to limit the outer movement of the fingers.

4. In an automobile safety device, a base comprising a lower substantially rectangular section and an upper substantially rectangular section mounted upon the lower section, said lower section having end recesses, lugs on the ends of the upper section engaging in said recesses, an extension on the lower section intermediate the ends thereof, a lug carried by said extension, said lower section having sockets therein opening onto the extension, means for yieldingly holding the steering mechanism of the automobile in center position including fingers pivotally mounted in said sockets and normally engaging with opposite sides of said lug, and means to detachably secure the base to a stationary part of the automobile.

In testimony whereof I have hereunto set my hand this 24th day of October, 1914.

ROBERT C. SHEPHERD.

In presence of—
LORRAINE E. DURROW,
LORA M. BOWERS.